US010332527B2

(12) United States Patent
Stone et al.

(10) Patent No.: US 10,332,527 B2
(45) Date of Patent: Jun. 25, 2019

(54) METHOD AND APPARATUS FOR ENCODING AND DECODING AUDIO SIGNAL

(71) Applicants: SAMSUNG ELECTRONICS CO., LTD., Suwon-si (KR); Michael Anthony Stone, Cambridge (GB)

(72) Inventors: Michael Anthony Stone, Cambridge (GB); Han-gil Moon, Daejeon (KR); Nam-suk Lee, Suwon-si (KR); Eun-mi Oh, Seoul (KR)

(73) Assignees: SAMSUNG ELECTRONICS CO., LTD., Suwon-si (KR); Michael Anthony Stone, Cambridge (GB)

(*) Notice: Subject to any disclaimer, the term of this patent is extended or adjusted under 35 U.S.C. 154(b) by 183 days.

(21) Appl. No.: 14/916,808

(22) PCT Filed: Sep. 5, 2013

(86) PCT No.: PCT/KR2013/008040
§ 371 (c)(1),
(2) Date: Mar. 4, 2016

(87) PCT Pub. No.: WO2015/034115
PCT Pub. Date: Mar. 12, 2015

(65) Prior Publication Data
US 2016/0196826 A1 Jul. 7, 2016

(51) Int. Cl.
G10L 19/005 (2013.01)
G10L 19/022 (2013.01)
G10L 15/12 (2006.01)
G10L 19/035 (2013.01)
G10L 19/032 (2013.01)

(52) U.S. Cl.
CPC ........... G10L 19/005 (2013.01); G10L 15/12 (2013.01); G10L 19/022 (2013.01); G10L 19/035 (2013.01); G10L 19/032 (2013.01)

(58) Field of Classification Search
CPC ..... G10L 19/022; G10L 19/032; G10L 19/005; G10L 19/035; G10L 15/12
See application file for complete search history.

(56) References Cited

U.S. PATENT DOCUMENTS 5,341,457 A 8/1994 Hall, II et al.
5,960,037 A 9/1999 Ten Kate
(Continued)

FOREIGN PATENT DOCUMENTS

EP 0709006 B1 3/1997
KR 10-2009-0032820 A 4/2009
(Continued)

OTHER PUBLICATIONS

Schnell, et al., "Low Delay Filterbanks for Enhanced Low Delay Audio Coding", 2007 IEEE Workshop on Applications of Signal Processing to Audio and Acoustics, Oct. 21-24, 2007, New Paltz, NY, pp. 235-238.
(Continued)

Primary Examiner — Angela A Armstrong
(74) Attorney, Agent, or Firm — Sughrue Mion, PLLC

(57) ABSTRACT

Provided are an apparatus and a method for encoding and decoding audio signals, in which when determining a masking threshold according to a psychoacoustic model, accurate results may be obtained for a short window-based audio signal as well as for a long window-based audio signal. The apparatus for encoding audio signals according to the present invention comprises a masking threshold determining unit configured to determine, on the basis of a frame length of a first window having a divided audio signal, a masking threshold for a second window that has a different frame length from that of the first window.

16 Claims, 8 Drawing Sheets

(56) References Cited

U.S. PATENT DOCUMENTS

| | | | |
|---|---|---|---|
| 2009/0040997 A1* | 2/2009 | Oh | H04N 21/4382 370/345 |
| 2009/0089049 A1 | 4/2009 | Moon et al. | |
| 2010/0286991 A1 | 11/2010 | Hedelin et al. | |
| 2011/0015768 A1 | 1/2011 | Lim et al. | |
| 2011/0075855 A1* | 3/2011 | Oh | G10L 19/032 381/73.1 |
| 2011/0238424 A1 | 9/2011 | Keiler et al. | |
| 2014/0046670 A1 | 2/2014 | Moon et al. | |

FOREIGN PATENT DOCUMENTS

| | | |
|---|---|---|
| KR | 10-2009-0122142 A | 11/2009 |
| KR | 10-2010-0086001 A | 7/2010 |
| KR | 10-2011-0107295 A | 9/2011 |
| KR | 10-2015-0032614 A | 3/2015 |

OTHER PUBLICATIONS

Schnell, et al., "Enhanced MPEG-4 Low Delay AAC—Low Bitrate High Quality Communication", 122nd AES Convention, Vienna, Austria, Preprint 6998, May 2007, total 13 pages.

Schnell, et al., "MPEG-4 Enhanced Low Delay AAC—a new standard for high quality communication", 125th AES Convention, San Francisco, USA, Preprint 7503, Oct. 2008, total 14 pages.

Nayebi, et al, "Low Delay FIR Filter Banks: Design and Evaluation", IEEE Transactions on Signal Processing, vol. 42, No. 1, Jan. 1994, pp. 24-31.

Truong Q. Nguyen, "A Class of Generalized Cosine-Modulated Filter Bank", International Symposium on Circuits and Systems (ISCAS), San Diego, USA, 1992, pp. 943-946.

International Search Report dated Apr. 1, 2014 for International Application No. PCT/KR2013/008040.

* cited by examiner

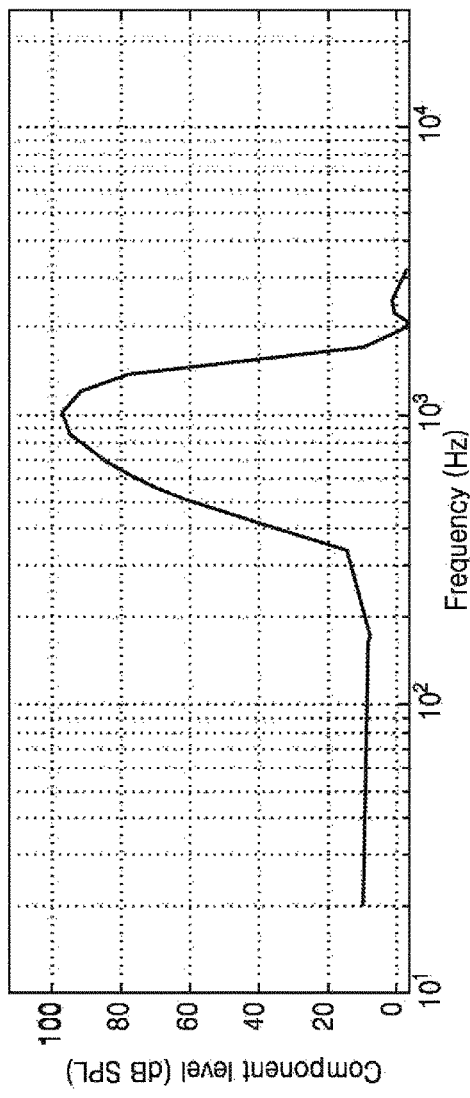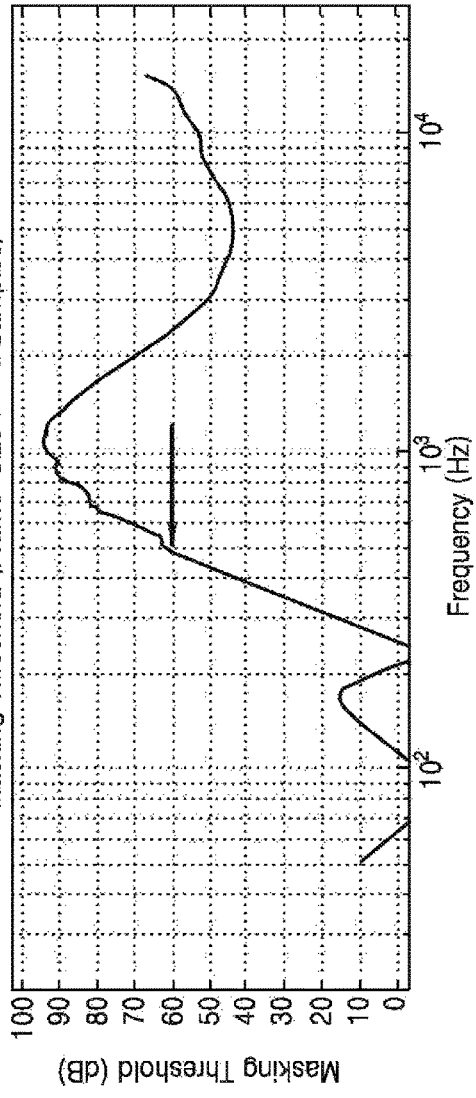
FIG. 2A
FIG. 2B

METHOD AND APPARATUS FOR ENCODING AND DECODING AUDIO SIGNAL

TECHNICAL FIELD

One or more embodiments of the present invention relate to a method and apparatus for encoding or decoding an audio signal, and more particularly, to a method and apparatus for encoding or decoding an audio signal in which the audio signal is quantized by using a masking threshold.

BACKGROUND ART

A masking effect, which is a phenomenon in psychoacoustics, occurs when quiet signals that are adjacent to loud signals are masked by the loud signals, thereby causing the quiet signals to be imperceptible to the human auditory system. If a quantization error, which is generated when an audio signal is quantized, is below a masking threshold, a listener may not hear quantization noise.

When encoding an audio signal, a basic unit of encoding, i.e., a frame, needs to be short in order to ensure a short latency time. However, the frame needs to be enough long to ensure a high spectral resolution for high quality of sound. Therefore, it is difficult to simultaneously ensure a short latency time and high quality of sound.

In psychoacoustics, when the frame is short, that is, when a masking threshold is calculated by using a short window, the masking threshold may be greater than a masking threshold that is calculated by using a long window. Therefore, when the audio signal is encoded based on the masking threshold that is calculated by using the short window, more quantization noise may flow in, and thus reduce quality of sound.

DISCLOSURE

Technical Problem

One or more embodiments of the present invention include a method and an apparatus for encoding an audio signal, in which a masking threshold is determined and errors of the masking threshold are corrected based on a frame size.

Technical Solution

According to one or more embodiments of the present invention, a method of encoding an audio signal includes performing frequency transformation on a first window generated by dividing the audio signal; determining, according to a frame size of the first window, a masking threshold by using a second window that has a different frame size from the first window; and quantizing scale factors of the first window that is transformed by using the masking threshold.

The determining of the masking threshold may include, when the frame size of the first window is smaller than a predetermined value, determining the masking threshold by using the second window that has a greater frame size than the predetermined value.

The determining of the masking threshold may include when the frame size of the first window is smaller than the predetermined value, re-sampling an audio signal that is sampled by using the first window, by using a time warping filter; and determining the masking threshold based on the second window, by using the re-sampled audio signal.

The warping parameter may be predetermined such that an output of the time warping filter has a spectral resolution corresponding to a Bark scale.

The determining of the masking threshold may include when the frame size of the first window is smaller than a predetermined value, determining a second masking threshold based on the second window that has a greater frame size than the predetermined value; and changing a first masking threshold, which is determined based on the first window, to the second masking threshold.

The determining of the second masking threshold may include determining the second masking threshold from the first masking threshold by using a lookup table that includes correction factors of masking thresholds according to each scale factor band of the first window.

The determining of the masking threshold may include, when the audio signal has a strong speech signal characteristic, determining that the frame size of the first window is small; and when it is determined that the frame size of the first window is small, determining the masking threshold based on the second window that has a different frame size from the first window.

The predetermined value may be 1,024 samples. The determining of the masking threshold may include determining the masking threshold based on a psychoacoustic model.

According to one or more embodiments of the present invention, an apparatus for encoding an audio signal includes a frequency transformer performing frequency transformation on a first window generated by dividing the audio signal; a masking threshold determination unit determining, according to a frame size of the first window, a masking threshold based on a second window that has a different frame size from the first window; and a quantizer quantizing scale factors of the first window that is transformed by using the masking threshold.

When the frame size of the first window is smaller than a predetermined value, the masking threshold determination unit may determine the masking threshold based on the second window that has a greater frame size than the predetermined value.

The masking threshold determination unit may include a time warping filter re-sampling an audio signal that is sampled by using the first window, when the frame size of the first window is smaller than the predetermined value; and a determination unit determining the masking threshold based on the second window, by using the re-sampled audio signal.

The warping parameter may be predetermined such that an output of the time warping filter has a spectral resolution corresponding to a Bark scale.

When the frame size of the first window is smaller than a predetermined value, the masking threshold determination unit may determine a second masking threshold based on the second window that has a greater frame size than the predetermined value; and may change a first masking threshold that is determined based on the first window to the second masking threshold.

The masking threshold determination unit may determine the second masking threshold from the first masking threshold by using a lookup table that includes correction factors of masking thresholds according to each scale factor band of the first window.

When the audio signal has a strong speech signal characteristic, the masking threshold unit may determine that the frame size of the first window is small; and when it is determined that the frame size of the first window is small, may determine the masking threshold based on the second window that has a different frame size from the first window.

The predetermined value may be 1,024 samples. The masking threshold determination unit may determine the masking threshold based on a psychoacoustic model.

According to one or more embodiments of the present invention, a method of decoding an audio signal includes receiving a first window of an encoded audio signal; inversely quantizing the first window by using quantization information that is transferred from an encoding apparatus; and inversely transforming scale factors of the first window that is inversely quantized. The first window is generated by using a masking threshold that is determined, according to a frame size of the first window, based on a second window that has a different frame size from the first window.

According to one or more embodiments of the present invention, an apparatus for decoding an audio signal includes an inverse quantizer receiving a first window of an encoded audio signal, and inversely quantizing the first window by using quantization information that is transferred from an encoding apparatus; and an inverse transformer inversely transforming scale factors of the first window that is inversely quantized. The first window is generated by using a masking threshold that is determined, according to a frame size of the first window, based on a second window that has a different frame size from the first window.

According to one or more embodiments of the present invention, a non-transitory computer-readable recording medium having recorded thereon a program, which, when executed by a computer, performs the method above.

Advantageous Effects

According to a method and apparatus for encoding and decoding an audio signal, a result obtained by correcting a masking threshold that is overestimated by using a short window is output. Therefore, according to the method and apparatus for encoding and decoding the audio signal, short latency time may be ensured by using the short window and quality of the encoded audio signal may be increased by accurately determining a masking threshold.

DESCRIPTION OF DRAWINGS

FIG. 2A and FIG. 2B are diagrams for explaining a masking threshold that is determined by using a short window;

BEST MODE

Figure 1A:
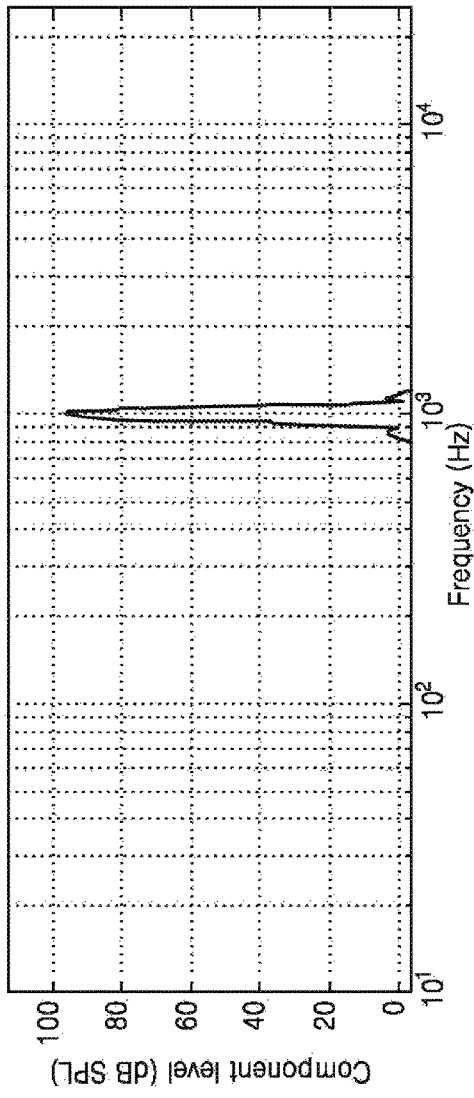
FIG. 1A and FIG. 1B are diagrams for explaining a masking threshold that is determined by using a long window.

According to an embodiment, a method of encoding an audio signal may include performing frequency transformation on a first window generated by dividing the audio signal; determining, according to a frame size of the first window, a masking threshold by using a second window that has a different frame size from the first window; and quantizing scale factors of the first window that is transformed by using the masking threshold.

According to an embodiment, an apparatus for decoding an audio signal may include an inverse quantizer receiving a first window of an encoded audio signal, and inversely quantizing the first window by using quantization information that is transferred from an encoding apparatus; and an inverse transformer inversely transforming scale factors of the first window that is inversely quantized. The first window is generated by using a masking threshold that is determined, according to a frame size of the first window, based on a second window that has a different frame size from the first window.

According to an embodiment, a non-transitory computer-readable recording medium may have recorded thereon a program, which, when executed by a computer, performs the aforementioned method.

Mode for Invention

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

The following terms may be interpreted according to the definition below. The terms that have not been described here may also be interpreted according to the intentions of the descriptions below. "Information" is a term that includes terms such as "value", "parameter", "coefficients", "elements", and the like, but embodiments of the present invention are not limited thereto, and the term "information" may be interpreted differently according to the embodiments.

In a broad sense, an "audio signal" is a term that differs from the term "video signal", and may refer to a signal that may be identified by auditory senses when the signal is reproduced. In a narrow sense, the audio signal is a term that differs from a speech signal, and may indicate a signal having no or little speech characteristics. In the embodiments of the present invention, the audio signal is interpreted in the broad sense, but the audio signal may be understood in the narrow sense when the audio signal and the speech signal are distinguishably used.

A "frame" is a data unit for encoding or decoding the audio signal, and is not limited to a predetermined number of samples or a predetermined time.

A method and an apparatus for encoding and decoding the audio signal may be a method and an apparatus for encoding and decoding frequency scale factors of the audio signal, or may be a method and an apparatus for processing the audio signal, which includes the method and the apparatus for encoding and decoding the frequency scale factors of the audio signal.

Hereinafter, the embodiments of the present invention will be described in detail with reference to the drawings.

Figure 1B:
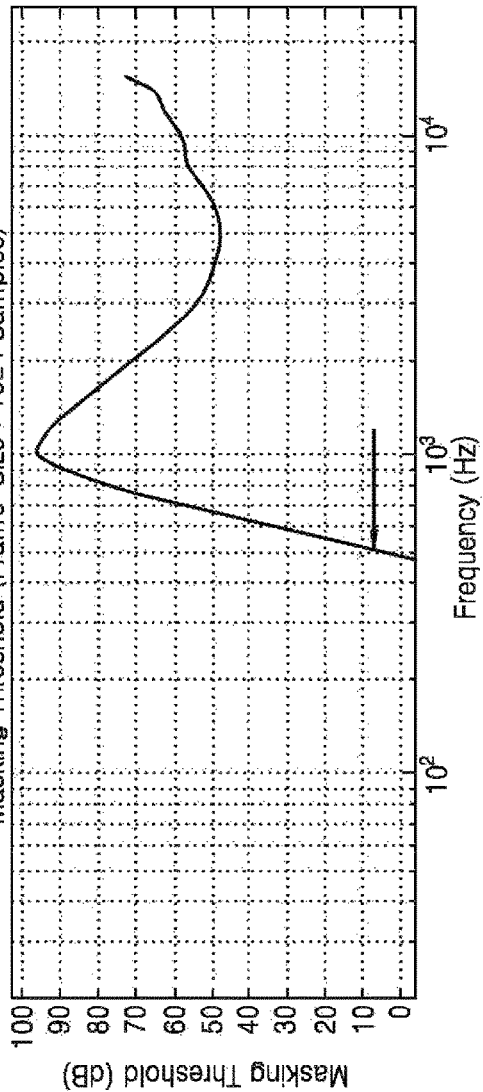

FIGS. 1 and 2 are diagrams for explaining a masking threshold.

In a psychoacoustic model, the masking threshold is generated by applying a masking effect to an input audio signal.

The masking effect, which is a phenomenon in psychoacoustics, occurs when quiet signals that are adjacent to loud signals are masked by the loud signals, thereby causing the quiet signals to be imperceptible to the human auditory system. For example, a conversation sound that is audible in quiet spaces may be inaudible in spaces with much noise, such as a bus stop where noisy buses pass by The masking threshold may indicate an audible threshold value for a listener. According to the masking effect, the listener may not hear an audio signal that is below the masking threshold.

In the psychoacoustic model, an audio signal is divided by using a window that has a plurality of frequency scale factor bands. In the plurality of frequency scale factor bands, a signal having the greatest energy exists in the middle, and other signals having relatively much smaller energy may exist around the signal having the greatest energy. Here, the signal having the greatest energy is a masker, and a masking curve is formed based on the masker. A signal having a relatively small energy, which is masked by the masking curve, is a masked signal or a maskee. "Masking" refers to a process of maintaining other signals, except for the masked signal, as effective signals.

The psychoacoustic model models the human auditory system by using predetermined algorithms. Although there are various psychoacoustic model algorithms known in the art that may be used with the embodiments of the present invention, most of the psychoacoustic model algorithms have the following theoretical basis:

Grouping frequency-transformed audio signals according to critical bands;

Determining tonal sounds and non-tonal sounds (i.e., noise elements) in the critical bands;

Calculating a masking threshold for each critical band element by using energy levels, tonality, and frequency locations; and Calculating a masking curve based on the masking threshold.

The masking threshold may be determined based on the psychoacoustic model as described above. FIG. 1 show masking thresholds calculated by using a long window, and FIG. 2 show masking thresholds calculated by using a short window.

The masking thresholds of FIG. 1 are calculated by using an audio signal divided by using a long window that has a frame size of 1,024 samples. The masking thresholds of FIG. 2 are calculated by using an audio signal divided by using a short window that has a frame size of 128 samples.

In FIGS. 1 and 2, masking thresholds that are calculated in the same frequency band are marked with arrows. As shown with the arrows, although the masking thresholds that are marked with the arrows in FIGS. 1 and 2 are calculated by using the same audio signal, the masking thresholds may be different depending on a frame size of a window that is used in the calculation.

As illustrated in FIG. 2, when the masking threshold is calculated by using a window that has a relatively short frame size, the masking threshold is overestimated by at most 50 dB than a masking threshold calculated by using a window that has a relatively long frame size.

In other words, a masking threshold that is calculated by using a short window to reduce latency time of the audio signal may be less accurate than a masking threshold that is calculated by using a long window or a normal window. When the audio signal is quantized by using an overestimated masking threshold, the audio signal may have a greater quantization noise level than an appropriate quantization noise level.

Therefore, when the audio signal is encoded based on the masking threshold that is inaccurately calculated by using the short window, more quantization noise may flow in, and thus reduce quality of sound.

By using the method and the apparatus for encoding the audio signal according to an embodiment of the present invention, an excessive inflow of quantization noise may be blocked during the encoding process by correcting an overestimated masking threshold in a psychoacoustic model formed based on a short window.

Figure 3:
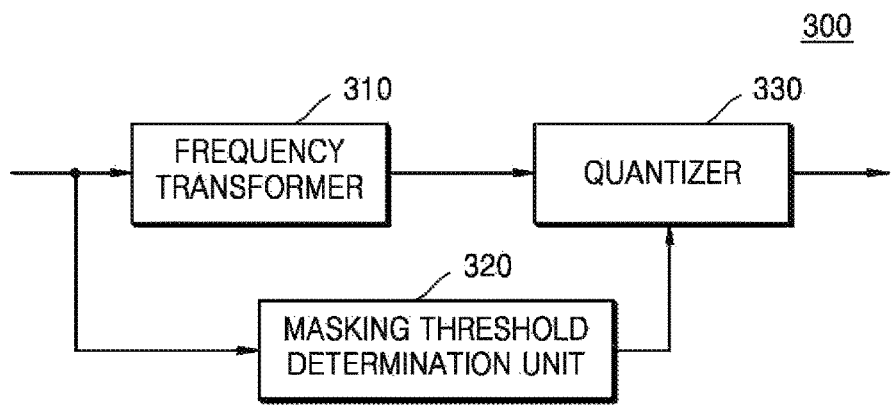
FIG. 3 is a block diagram of an apparatus for encoding an audio signal according to an embodiment of the present invention.

FIG. 3 is a block diagram of an apparatus 300 for encoding the audio signal according to an embodiment of the present invention.

Referring to FIG. 3, the apparatus 300 according to an embodiment of the present invention may include a frequency transformer 310, a masking threshold determination unit 320, and a quantizer 330.

The frequency transformer 310 may perform frequency transformation on a first window that is generated by dividing the audio signal.

The frequency transformer 310 may perform frequency transformation (or, time-to-frequency mapping) regarding the input audio signal, and thus generate a frequency spectrum. The input audio signal may be divided by using a window before being input.

The frequency transformer 310 may generate scale factors by performing frequency transformation on the first window. The frequency transformation of the first window may be performed by using a quadrature mirror filterbank (QMF) method, a modified discrete Fourier transform (MDCT) method, a fast Fourier transform (FFT) method, or the like, but the embodiments of the present invention are not limited thereto.

According to a frame size of the first window, the masking threshold determination unit 320 may determine a masking threshold by using a second window that has a different frame size from the first window.

The masking threshold determination unit 320 may use the aforementioned psychoacoustic model or the like to calculate the masking threshold. However, as described above, the marking threshold that is calculated by using the window that has a relatively short frame size may be less accurate than the masking threshold that is calculated by using the window that has a relatively long frame size.

Therefore, the apparatus 300 according to an embodiment of the present invention improves quality of encoded audio signals by including the masking threshold determination unit 320 that may accurately determine the masking threshold by correcting errors of the masking thresholds that are calculated by using the short window.

When the audio signal is divided by using the first window, i.e., the short window, the masking threshold determination unit 320 may determine the masking threshold by using the second window that has a greater frame size than the first window. In other words, the masking threshold determination unit 320 may correct errors of the masking threshold that is calculated by using the first window so that the masking threshold is accurately determined as when the masking threshold is calculated by using the second window.

The masking threshold determination unit 320 may determine whether or not the input audio signal is divided by using a short window by comparing a frame size of a window of the input audio signal to a predetermined value, determining whether an application used in the apparatus 300 is the application applied to the input audio signal that is divided by using a short window, or analyzing the input audio signal.

The predetermined value may be determined in advance according to the application of the apparatus 300, or a stored value that is determined in advance by a user of the apparatus 300. For example, when the frame size of the first window is smaller than 1,024 samples, the masking threshold determination unit 320 may determine that the audio signal is divided by using the short window. In this case, the predetermined value may be 1,024 samples.

Also, the masking threshold determination unit 320 may determine that the frame size of the first window is short when the input audio signal has a strong speech signal characteristic, and then determine the masking threshold by using the second window that has a different frame size from the first window.

For example, the masking threshold determination unit 320 may use a time warping filter to re-sample an audio signal that is sampled by using the first window, and thus determine the masking threshold based on the second window by using the re-sampled audio signal.

The apparatus 300 that determines a corrected masking threshold by using the time warping filter will be described in detail with reference to FIG. 4.

As another example, when the frame size of the first window is smaller than the predetermined value, the masking threshold determination unit 320 may determine a second masking threshold by using the second window that has a greater frame size than the predetermined value, and change a first masking threshold, which is determined by using the first window, to the second masking threshold.

When conditions for implementing the apparatus 300 are very limited, for example, when an additional encoding latency time is not allowed or when additional sources (e.g., power or memory) for operating the time warping filter are not allowed, the masking threshold determination unit 320 may determine the masking threshold by using a lookup table that is generated according to statistical data.

The masking threshold determination unit 320 may derive the second masking threshold from the first masking threshold by using a lookup table that includes correction factors of masking thresholds according to each scale factor band of the first window.

Also, when it is determined that the first window is not a short window, the masking threshold determination unit 320 may determine the masking threshold according to the frame size of the first window. Based on the frame size of the first window, the masking threshold determination unit 320 may adaptively determine an accurate masking threshold that is obtained by correcting the errors of the masking thresholds calculated by using the short window, and output the accurate masking threshold to the quantizer 330.

The quantizer 330 may quantize the scale factors of the first window that is transformed in the frequency transformer 310, by using the masking threshold that is determined in the masking threshold determination unit 320.

Quantization noise may be generated while the quantizer 330 is quantizing the scale factors of the first window. The quantizer 330 may quantize the scale factors such that the quantization noise is smaller than the masking threshold. When the quantization noise is smaller than the masking threshold, energy of the quantization noise is masked due to the masking effect. In other words, the listener may not hear the quantization noise that is smaller than the masking threshold.

The audio signal that is quantized in the quantizer 330 may undergo a noiseless coding process, a bitstream packing process, and the like, and thus be output in an encoded bitstream format.

For convenience of description, the embodiments of the present invention only include operations regarding a single first window. However, the apparatus 300 according to the embodiments of the present invention may repeat the operations described in the embodiments of the present invention for each of a plurality of first windows.

Figure 4:
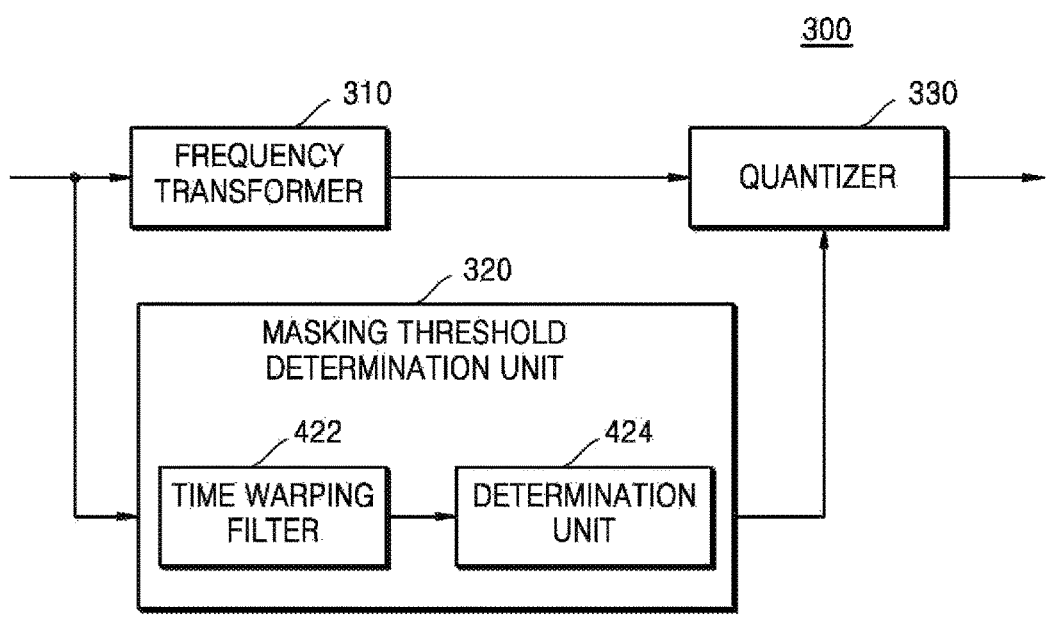
FIG. 4 is a block diagram of the apparatus for encoding the audio signal, which includes a time warping filter according to an embodiment of the present invention.

FIG. 4 is a block diagram of the apparatus 300 for encoding an audio signal, which includes a time warping filter 422 according to an embodiment of the present invention.

As illustrated in FIG. 4, the apparatus 300 may include the time warping filter 422 and the determination unit 424 in the masking threshold determination unit 320.

When the frame size of the first window is smaller than the predetermined value, the time warping filter 422 may re-sample the audio signal that is sampled by using the first window. Since the apparatus 300 includes the time warping filter 422, the apparatus 300 which uses samples of the audio signal that is divided by using the short window may obtain a similar effect as if analyzing the audio signal by using the long window. For example, the apparatus 300 may re-sample an audio signal, which has been sampled at a sampling rate of 10 times per second, at a sampling rate of 100 times per second, and thus obtain an effect as if the masking threshold is calculated by using a window that is 10 times longer.

The time warping filter 422 may re-sample the input audio signal according to Equation 1.

$$A(z) = \frac{z^{-1} - a}{1 - a * z^{-1}} \quad \text{[Equation 1]}$$

The "a" is a warping parameter that controls a degree of warping. The warping parameter may be predetermined according to sampling rates of the audio signal. For example, in order to obtain a spectral resolution corresponding to a Bark scale in the time warping filter 422, the warping parameter may be determined as 0.5756 at a sampling rate of 48 kHz.

Figure 5A:
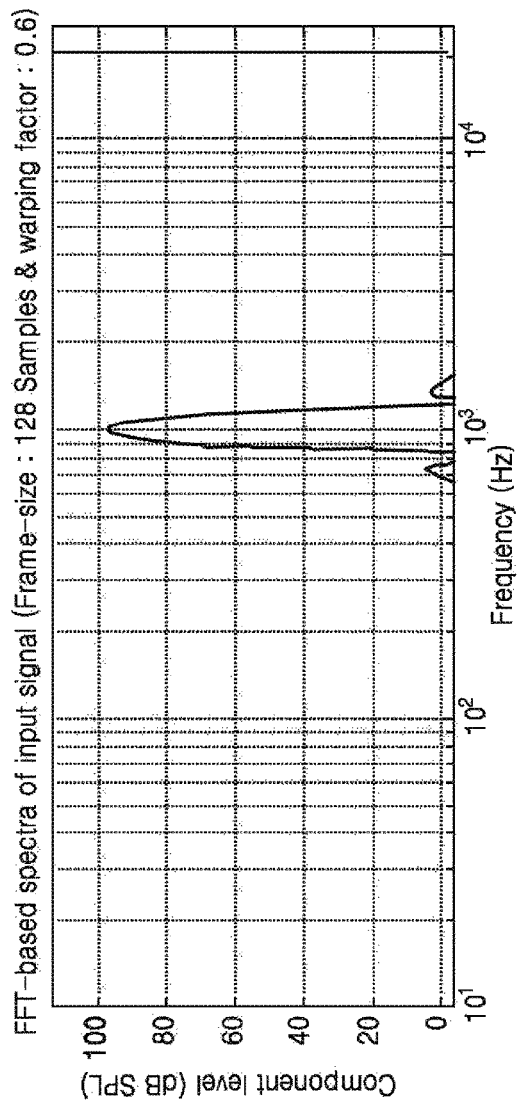
FIG. 5A and FIG. 5B are view for explaining a masking threshold determined in the apparatus for encoding the audio signal according to an embodiment of the present invention.
Figure 5B:
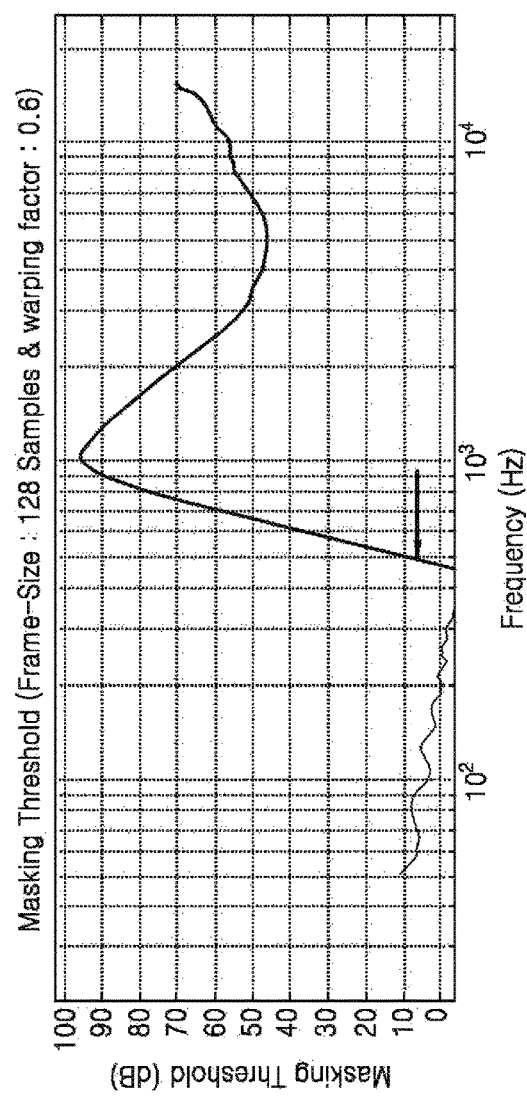

However, the warping parameter is not limited thereto, and may have a smaller or greater value according to latency time and complexity of an audio signal processing system. FIG. 5 illustrates a masking threshold that is calculated by using the time warping filter 422.

FIG. 5 is a view for explaining a masking threshold determined in the apparatus 300 according to an embodiment of the present invention.

FIG. 5 illustrates masking thresholds that are calculated by using the audio signal divided by using the short window that has a frame size of 128 samples.

In FIG. 5, an arrow marks a masking threshold that is calculated in a frequency band that is the same as the frequency bands marked with the arrows in FIGS. 1 and 2.

Although the masking threshold is calculated by using the same audio signal as in FIG. 2 that is divided by using the short window, the masking threshold of the frequency band marked with the arrow in FIG. 5 is different from the masking threshold of the frequency band marked with the arrow in FIG. 2. However, the masking threshold of the frequency band marked with the arrow in FIG. 5 is similar to the masking threshold calculated in the frequency band marked with the arrow in FIG. 1.

Therefore, the apparatus 300 according to an embodiment of the present invention may output a result obtained by correcting a masking threshold that is overestimated by using the short window. Accordingly, even when the short window is used, the masking threshold may be accurately obtained as when the masking threshold is calculated based on the audio signal divided by using the long window.

The apparatus 300 according to an embodiment of the present invention may not only obtain a short latency time by using the short window, but may also accurately determine the masking threshold, and thus improve quality of the encoded audio signals.

Figure 6:
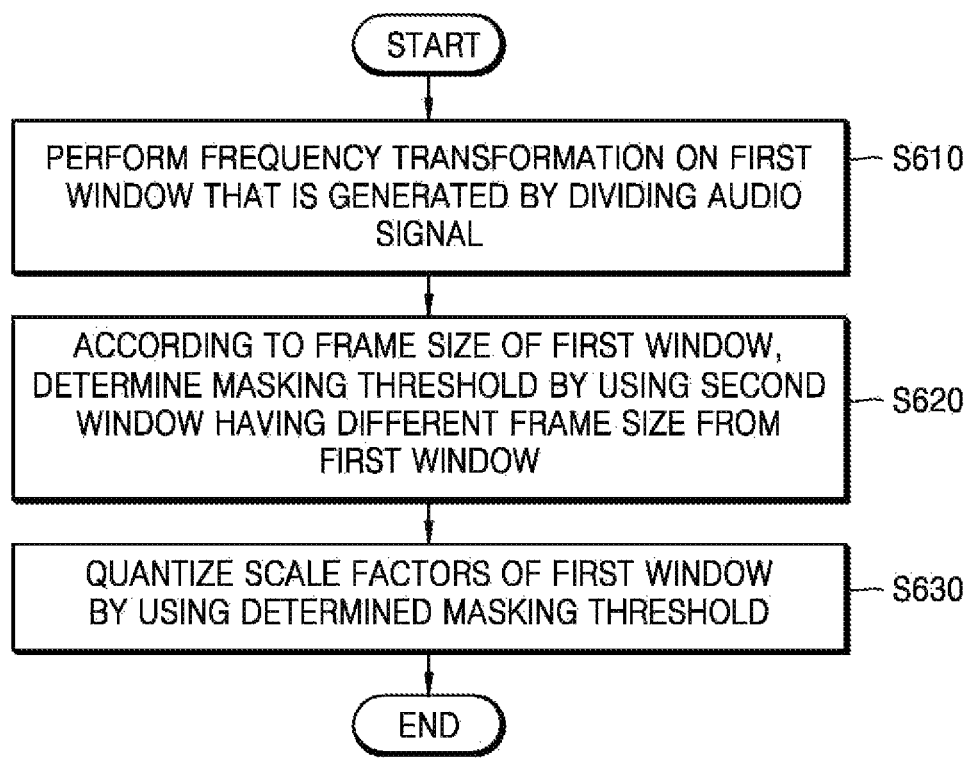
FIG. 6 is a flowchart of a method for encoding the audio signal according to an embodiment of the present invention.

FIG. 6 is a flowchart of a method for encoding an audio signal according to an embodiment of the present invention.

Referring to FIG. 6, the method for encoding the audio signal according to an embodiment of the present invention includes operations that are processed by the apparatus 300 of FIG. 3 or 4. Therefore, all of the aforementioned features and elements of the apparatus 300 of FIG. 3 or 4 apply to the method of FIG. 6.

In operation S610, the apparatus 300 may perform frequency transformation on the first window.

In operation S620, according to the frame size of the first window, the apparatus 300 may determine the masking threshold by using the second window that has a different frame size from the first window.

In order to determine the masking threshold based on the second window, the apparatus 300 may use the time warping filter 422 or the lookup table that includes the correction factors of the masking thresholds.

In operation S630, the apparatus 300 may quantize the scale factors of the first window that is transformed in operation S610, by using the masking threshold determined in operation S620.

Embodiments

Figure 7:
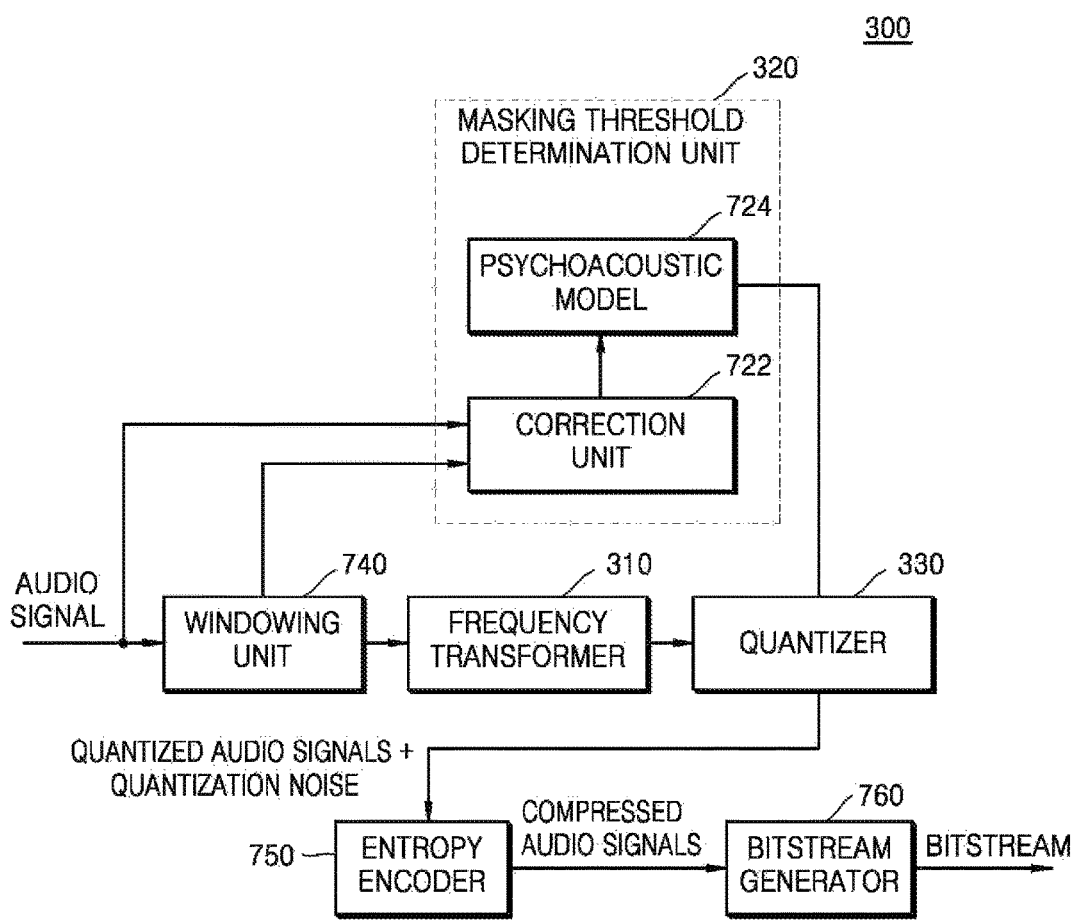
FIG. 7 is a block diagram of the apparatus for encoding the audio signal, which includes a windowing unit according to an embodiment of the present invention.

FIG. 7 is a block diagram of the apparatus 300 including a windowing unit 740 according to an embodiment of the present invention.

As illustrated in FIG. 7, the apparatus 300 may include a windowing unit 740, an entropy encoder 750, and a bitstream generator 760. Also, the apparatus 300 may include an adjusting unit 722 and a psychoacoustic model 724 in the masking threshold determination unit 320.

The windowing unit 740 may divide the input audio signal by using a window. A frame size of the window may change according to applications applied to the apparatus 300.

The masking threshold determination unit 320 obtains the frame size of the first window from the windowing unit 740. When the frame size of the first window is smaller than the predetermined value, the masking threshold determination unit 320 may determine and output the masking threshold by using the second window that has a greater frame size than the predetermined value.

In particular, when the frame size of the first window is smaller than the predetermined value, the adjusting unit 722 may output an audio signal, which is re-sampled by using a time warping filter, to the psychoacoustic model 724. Based on the re-sampled audio signal, the psychoacoustic model 724 may determine and output the masking threshold by using the second window that has a relatively greater frame size.

Alternatively, the adjusting unit 722 may output the correction factors included in the lookup table to the psychoacoustic model 724. The psychoacoustic model 724 may correct the masking threshold by using the first window according to the correction factors, and thus determine and output the masking threshold by using the second window that has a relatively greater frame size.

The adjusting unit 722 and the psychoacoustic model 724 of FIG. 7 may respectively correspond to the time warping filter 422 and the determination unit 424 of FIG. 4.

The entropy encoder 750 may entropy-encode a quantized audio signal. The entropy encoder 750, may encode the quantized audio signal by using, for example, Huffman coding, range encoding, arithmetic coding, and the like, but is not limited thereto.

The bitstream generator 760 may form and output at least one bitstream from the encoded audio signal that is output from the entropy encoder 750.

Since the apparatus 300 according to an embodiment of the present invention illustrated in FIG. 7 includes the masking threshold determination unit 320 that includes the adjusting unit 722, the apparatus 300 may correct a masking threshold that is overestimated, by using the audio signal divided by using the short window, and then perform quantization in the quantizer 330.

When encoding the audio signal, the apparatus 300 according to an embodiment of the present invention illustrated in FIG. 7 may not only obtain a short latency time by using the short window, but may also accurately determine the masking threshold, and thus improve quality of the encoded audio signals.

Figure 8:
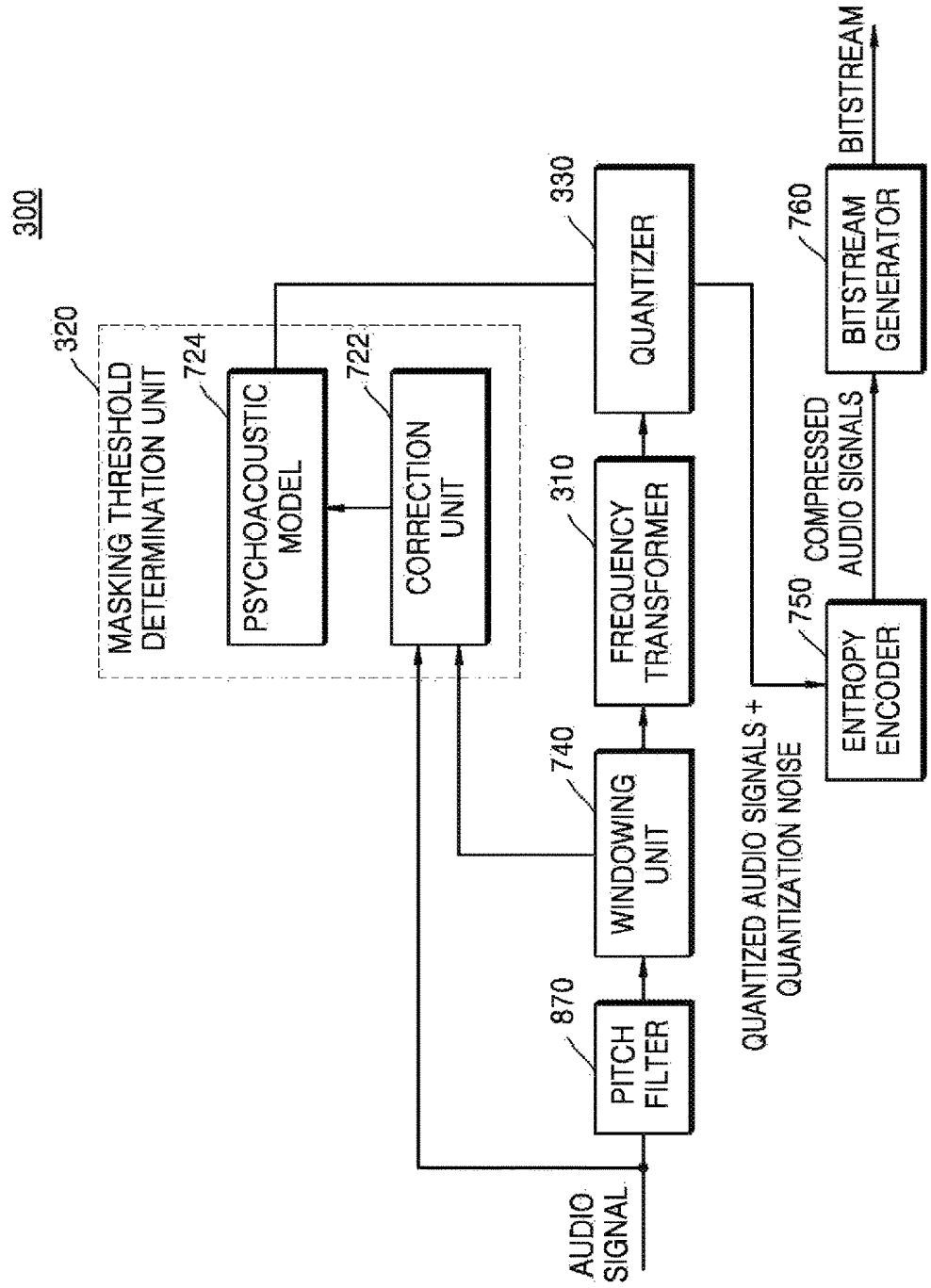
FIG. 8 is a block diagram of the apparatus for encoding the audio signal, which includes the windowing unit and a pitch filter according to an embodiment of the present invention.

FIG. 8 is a block diagram of the apparatus 300 for encoding an audio signal, which includes the windowing unit 740 and a pitch filter 870 according to an embodiment of the present invention.

In a system for encoding the audio signal in which the short window is used for a short latency time, the pitch filter 870 may be used to reduce coding distortion that frequently occurs in periodic music and speech signals.

An apparatus for encoding an audio signal, which uses the pitch filter 870, may overestimate the masking threshold by using the audio signal divided by using the short window. Therefore, in order to solve the overestimation problem, when the pitch filter 870 is included, the apparatus 300 according to an embodiment of the present invention may be configured as in FIG. 8. The description of features and elements that are the same as in FIG. 7 will be omitted.

Figure 9:
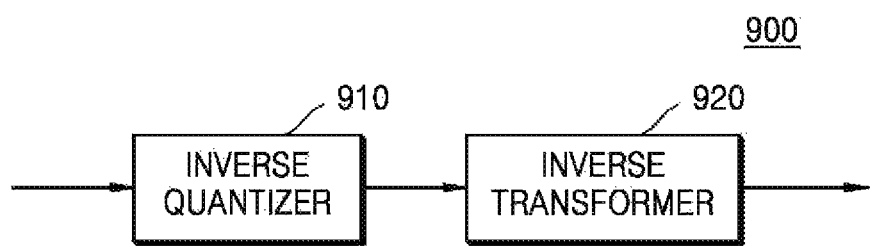
FIG. 9 is a block diagram of an apparatus for decoding the audio signal according to an embodiment of the present invention.

FIG. 9 is a block diagram of an apparatus 900 for decoding an audio signal according to an embodiment of the present invention Referring to FIG. 9, the apparatus 900 according to an embodiment of the present invention may include an inverse quantizer 910, and an inverse transformer 920.

The inverse quantizer 910 may receive a first window of the encoded audio signal. The inverse quantizer 910 may inversely quantize the first window by using quantization information that is transferred from the apparatus 300.

The first window of the encoded audio signal may be generated by entropy-decoding, or alternatively, by using the masking threshold. According to a frame size of the first window, the masking threshold may be determined by using a second window that has a different frame size from the first window. Also, the quantization information transferred from the apparatus 300 may include sampling frequency information that is used when encoding the audio signal.

The inverse quantizer 910 may inversely quantize the first window, and thus generate scale factors of the first window.

The inverse transformer 920 may perform frequency-to-time transformation (or, frequency-to-time mapping), and thus inversely transform the scale factors of the first window that is inversely quantized in the inverse quantizer 910. The frequency-to-time transformation may be performed by using an inverse quadrature mirror filterbank (IQMF) method, an inverse modified discrete Fourier transform (IMDCT) method, an inverse fast Fourier transform (IFFT) method, or the like, but the embodiments of the present invention are not limited thereto.

The audio signal, which is transferred from the apparatus 300 that includes the pitch filter 870 illustrated in FIG. 8, is inversely transformed in the inverse transformer 920, and may be recovered by applying low delay synthesis windowing and pitch post-filtering.

For convenience of description, the embodiments of the present invention only include operations regarding a single first window. However, the apparatus 900 according to the embodiments of the present invention may repeat the operations described in the embodiments of the present invention for each of a plurality of first windows.

Figure 10:
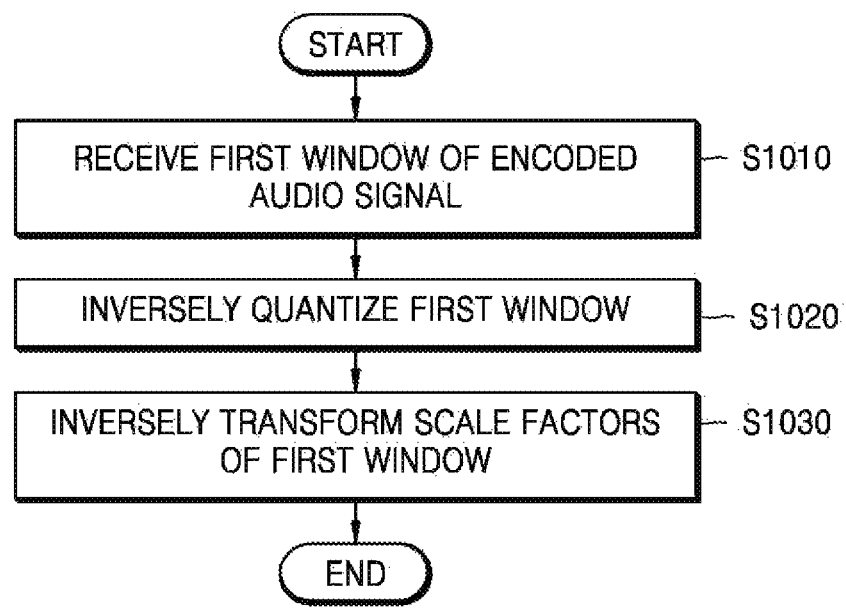
FIG. 10 is a flowchart of a method for decoding the audio signal according to an embodiment of the present invention.

FIG. 10 is a flowchart of a method for decoding an audio signal according to an embodiment of the present invention.

Referring to FIG. 10, the method of decoding the audio signal according to an embodiment of the present invention includes operations that are processed by the apparatus 900 of FIG. 9. Therefore, all of the aforementioned features and elements of the apparatus 900 of FIG. 9 apply to the method of FIG. 10.

In operation S1010, the apparatus 900 may receive the first window of the encoded audio signal.

The apparatus 900 may receive a bitstream, and extract an entropy-encoded audio signal from the bitstream. The apparatus 900 may entropy-decode the entropy encoded audio signal. The first window that is received in operation S1010 may be an entropy-decoded audio signal.

The first window that is received in operation S1010 may be generated by using the masking threshold. According to the frame size of the first window, the masking threshold may be determined by using the second window that has a different frame size from the first window.

In operation S1020, the apparatus 900 may inversely quantize the first window received in operation S1010 by using the quantization information received from the apparatus 300. The apparatus 900 may generate the scale factors of the first window by inversely quantizing the received first window.

In operation S1030, the apparatus 900 may recover the audio signal by inversely transforming the scale factors of the first window.

Other embodiments of the present invention can also be implemented through computer-readable code/instructions in/on a medium, e.g., a computer-readable medium, to control at least one processing element to implement any above described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream, according to one or more embodiments of the present invention. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

The invention claimed is:

1. A method of encoding an audio signal implemented by at least one processor, the method comprising:
   receiving the audio signal;
   performing frequency transformation on a frame of the audio signal which is divided by using a first window;
   determining a masking threshold of the frame;
   quantizing transform coefficients of the frame, by using the masking threshold; and
   generating and outputting a bitstream from the quantized transform coefficients,
   wherein the determining the masking threshold comprises:
      when a size of the first window is not smaller than a predetermined value, determining a first masking threshold which is obtained from the frame as the masking threshold, and
      when the size of the first window is smaller than the predetermined value, determining a second masking threshold, which corresponds to a second window that has a greater size than the predetermined value, as the masking threshold, and the second masking threshold is obtained by re-sampling the frame of the audio signal using a time warping filter or obtained from the first masking threshold by using a lookup table which includes correction factors of the first masking threshold.

2. The method of claim 1, wherein the determining of the second masking threshold as the masking threshold comprises:
   re-sampling the frame of the audio signal by using the time warping filter;

obtaining the second masking threshold from the re-sampled frame; and
determining the second masking threshold as the masking threshold.

3. The method of claim 2, wherein the time warping filter satisfies:

$$A(z) = \frac{z^{-1} - a}{1 - a * z^{-1}},$$

where "a" is a warping parameter that is predetermined according to sampling rates of the audio signal.

4. The method of claim 3, wherein the warping parameter is predetermined such that an output of the time warping filter has a spectral resolution corresponding to a Bark scale.

5. The method of claim 1, wherein the determining of the second masking threshold as the masking threshold comprises:
deriving the second masking threshold from the first masking threshold by using the lookup table; and
determining the second masking threshold as the masking threshold.

6. The method of claim 1, wherein the determining of the masking threshold comprises:
when the audio signal has a strong speech signal characteristic, determining that the size of the first window is smaller than the predetermined value.

7. The method of claim 1, wherein the determining of the masking threshold comprises determining the masking threshold based on a psychoacoustic model.

8. A non-transitory computer-readable recording medium having recorded thereon a program, which, when executed by a computer, performs the method of claim 1.

9. An apparatus for encoding an audio signal, the apparatus comprising:
at least one processor configured to:
receive the audio signal,
perform frequency transformation on a frame of the audio signal which is divided by using a first window,
determine a masking threshold of the frame,
quantize transform coefficients of the frame, by using the masking threshold, and
generate and output a bitstream from the quantized transform coefficients,
wherein the at least one processor is further configured to:
when a size of the first window is not smaller than a predetermined value, determine a first masking threshold which is obtained from the frame as the masking threshold, and
when the size of the first window is smaller than the predetermined value, determine a second masking threshold, which corresponds to a second window that has a greater size than the predetermined value, as the masking threshold, and the second masking threshold is obtained by re-sampling the frame of the audio signal using a time warping filter or obtained from the first masking threshold by using a lookup table which includes correction factors of the first masking threshold.

10. The apparatus of claim 9, wherein, when the size of the first window is smaller than the predetermined value, the at least one processor is further configured to:
re-sample the frame of the audio signal by using the time warping filter;
obtain the second masking threshold from the re-sampled frame; and
determine the second masking threshold as the masking threshold.

11. The apparatus of claim 10, wherein the time warping filter satisfies:

$$A(z) = \frac{z^{-1} - a}{1 - a * z^{-1}},$$

where "a" is a warping parameter that is predetermined according to sampling rates of the audio signal.

12. The apparatus of claim 11, wherein the warping parameter is predetermined such that an output of the time warping filter has a spectral resolution corresponding to a Bark scale.

13. The apparatus of claim 9, wherein, when the size of the first window is smaller than the predetermined value, the at least one processor is further configured to:
derive the second masking threshold from the first masking threshold by using the lookup table; and
determine the second masking threshold as the masking threshold.

14. The apparatus of claim 9, wherein when the audio signal has a strong speech signal characteristic, the at least one processor is further configured to determine that the size of the first window is smaller than the predetermined value.

15. The apparatus of claim 9, wherein the at least one processor is further configured to determine the masking threshold based on a psychoacoustic model.

16. A method of decoding an audio signal implemented by at least one processor, the method comprising:
receiving a bitstream and extracting an encoded audio signal from the bitstream;
inversely quantizing the encoded audio signal by using quantization information that is received from an encoding apparatus; and
recovering and outputting the audio signal by inversely transforming transform coefficients of the encoded audio signal that is inversely quantized,
wherein the encoded audio signal that is generated by performing frequency transformation on a frame of the audio signal which is divided by using a first window, determining a masking threshold of the frame, and quantizing transform coefficients of the frame by using the masking threshold,
wherein the determining of the masking threshold comprises:
when a size of the first window is not smaller than a predetermined value, determining a first masking threshold which is obtained from the frame as the masking threshold, and
when the size of the first window is smaller than the predetermined value, determining a second masking threshold, which corresponds to a second window that has a greater size than the predetermined value, as the masking threshold, and the second masking threshold is obtained by re-sampling the frame of the audio signal using a time warping filter or obtained from the first masking threshold by using a lookup table which includes correction factors of the first masking threshold.

* * * * *